(12) United States Patent
Matsumoto et al.

(10) Patent No.: US 6,959,910 B2
(45) Date of Patent: Nov. 1, 2005

(54) SOLENOID VALVE HAVING MANUALLY-OPERATED DEVICE

(75) Inventors: Takumi Matsumoto, Tsukuba-gun (JP); Makoto Ishikawa, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 99 days.

(21) Appl. No.: 10/419,178

(22) Filed: Apr. 21, 2003

(65) Prior Publication Data

US 2003/0226993 A1 Dec. 11, 2003

(30) Foreign Application Priority Data

Jun. 11, 2002 (JP) .............................. 2002-169395

(51) Int. Cl.[7] .............................................. F16K 31/06
(52) U.S. Cl. ............................ 251/129.03; 251/129.15
(58) Field of Search ....................... 257/129.03, 129.15, 257/14

(56) References Cited

U.S. PATENT DOCUMENTS

| | | | | |
|---|---|---|---|---|
| 1,406,333 A | * | 2/1922 | Beach ................... | 251/129.03 |
| 1,674,914 A | * | 6/1928 | Murray .................. | 251/129.03 |
| 3,116,047 A | * | 12/1963 | Andresen, Jr. ......... | 251/129.03 |
| 3,351,093 A | | 11/1967 | Frantz | |
| 3,713,458 A | * | 1/1973 | Lee ....................... | 251/129.03 |
| 4,344,603 A | | 8/1982 | Hozumi et al. | |
| 4,501,299 A | * | 2/1985 | Klimowicz et al. .... | 251/129.03 |
| 4,534,381 A | | 8/1985 | Hozumi et al. | |
| 4,598,736 A | * | 7/1986 | Chorkey ................ | 251/129.03 |
| 4,627,597 A | * | 12/1986 | Brausfeld et al. ...... | 251/129.03 |
| 5,441,233 A | * | 8/1995 | Asou et al. ............ | 251/129.15 |

FOREIGN PATENT DOCUMENTS

| | | |
|---|---|---|
| DE | 1 896 603 U | 7/1964 |
| DE | 1 243 936 B | 7/1967 |
| DE | 1 908 689 C | 8/1970 |
| DE | 71 43 862 U | 11/1972 |
| DE | 30 32 479 A1 | 3/1981 |
| DE | 33 46 290 C2 | 7/1984 |
| DE | 223 785 A1 | 6/1985 |

* cited by examiner

*Primary Examiner*—John Bastianelli
(74) *Attorney, Agent, or Firm*—Oblon, Spivak, McClelland, Maier & Neustadt, P.C.

(57) ABSTRACT

A solenoid valve includes a main valve having a valve member which switches over flow paths by contacting with and separating from valve seats in a valve casing, a solenoid operating portion to drive the valve member, and a manually-operated device including an operation rod air-tightly and slidably accommodated in a rod-insertion hole provided in the valve casing and abuts against an end surface of a movable iron core to push the movable iron core in its axial direction, and an operating member movably mounted to a mounting surface of the valve casing to drive the operation rod.

8 Claims, 10 Drawing Sheets

SOLENOID VALVE HAVING MANUALLY-OPERATED DEVICE

TECHNICAL FIELD TO WHICH THE INVENTION BELONGS

The present invention relates to a solenoid valve having a manually-operated device for manually operating a valve member when the valve member closes a valve seat due to an accident such as a power failure.

PRIOR ART

As shown in FIGS. 11 and 12, a solenoid valve having a manually-operated device for manually opening a valve seat when a valve member closes the valve seat due to an accident such as a power failure is known.

That is, a solenoid valve having a manually-operated device shown in FIG. 11 comprises a main valve 202 having valve members 220, 221 which switch over flow paths by contacting with and separating from valve seats 215, 216 in a valve casing 210, and a solenoid operating portion 203 which drives the valve members 220, 221 toward and away from the valve seats 215, 216. The valve casing 210 is provided with a through hole 250 extending from its surface to an end of the movable iron core 233 of the solenoid operating portion 203. The through hole 250 is provided with a taper portion 251a whose tip end abuts against an end of the movable iron core 233. The operating member 251 can slide with respect to the through hole 250.

When a valve member 220 closes a valve seat 215 due to an accident such as a power failure, if the operating member 251 is pushed, the taper portion 251a of the operating member 251 pushes up the end of the movable iron core 233, and the valve seat 215 can be opened.

A solenoid valve having a manually-operated device shown in FIG. 12 comprises a main valve 202 having a valve member 220 which switches over flow paths by contacting with and separating from valve seat 215 in a valve casing 210, and a solenoid operating portion 203 which drives the valve member 220 toward and away from the valve seat 215. The valve casing 210 is provided with a through hole 250 extending from its surface to an end of the movable iron core 233 of the solenoid operating portion 203. The through hole 250 is provided with an operating member 251 whose tip end has a cam 251b and whose other tip end has an operating member 251 including a groove 251c. The operating member 251 can turn.

When a valve member 220 closes a valve seat 215 due to an accident such as a power failure, if a turning tool such as a driver is inserted into the groove 251a to turn the operating member 251, the cam 251b allows the movable iron core 233 to slide toward a stationary iron core 232 and thus, the valve seat 215 can be opened.

In the case of the known solenoid valve having the manually-operated device, the through hole 250 of the valve casing 210 is straightly movably or rotatably provided with the operating member 251 of the manually-operated device 205, and the movable iron core 233 is moved by the taper portion 251a or the cam 251b provided on the tip end of the operating member 251. Therefore, it is necessary to provide the manually-operated device 205 near the end of the movable iron core 233. For this purpose, if the solenoid valve is made compact in size, there is a problem that portion of the solenoid valve constituted by a substrate or the like on which an electronic component such as a connector for electrical connection and a lamp is located at an installing position of the manually-operated device 205.

Further, in the conventional solenoid valve 205 having the manually-operated device, the movable iron core 233 is moved by the taper portion 251a or the cam 251b provided on the tip end of the operating member 251. Therefore, deviated load is applied to the operating member 251 in a direction at right angles to its axial direction, and a sealing failure is prone to be generated when the operating member 251 is operated.

DISCLOSURE OF THE INVENTION

The present invention has been accomplished to solve such problems, and it is a technical object of the invention to provide a solenoid valve having a manually-operated device capable of disposing the manually-operated device in the solenoid valve while avoiding a portion thereof constituted by a substrate or the like on which an electronic component such as a connector for electrical connection and a lamp is mounted.

It is another technical object of the invention to provide a solenoid valve having a manually-operated device capable of preventing a deviated load from being applied to the operating rod of the manually-operated device, and capable of preventing a seal failure from being generated.

To achieve the above objects, a solenoid valve having a manually-operated device of the present invention comprises a main valve including a valve member for opening and closing a valve seat in a valve casing, a solenoid operating portion having a movable iron core which drives the valve member, and a manually-operated device for actuating the valve member by manually displacing the movable iron core, the manually-operated device comprising a rod-insertion hole provided in the valve casing, an operation rod which is accommodated in the rod-insertion hole such that the operation rod can move in a direction parallel to an axis of the movable iron core and which moves to abut against the movable iron core to displace the movable iron core, and an operating member for operating the operation rod, the operating member includes a slide member which is movably mounted to a mounting surface of the valve casing in a state in which the operating member is engaged with the operation rod.

According to the present invention having the above-described structure, the operation rod for displacing the movable iron core is disposed in the valve casing such that the operation rod can move in a direction parallel to the axis of the movable iron core, and the operating member for operating the operation rod is mounted to the mounting surface of he valve casing. Therefore, it is unnecessary to dispose the manually-operated device near the end of the movable iron core, and the deviated load is not applied to the operation rod.

Thus, it is possible to dispose the manually-operated device in the solenoid valve while avoiding a portion thereof constituted by a substrate or the like on which an electronic component such as a connector for electrical connection and a lamp is mounted, and it is possible to prevent a seal failure due to the deviated load from being generated.

In the present invention, the rod-insertion hole is provided at a position opposed to a tip end surface of the movable iron core such that the rod-insertion hole is directed in a direction parallel to the axis of the movable iron core.

According to a preferable concrete embodiment of the invention, an operating portion mounting opening which is thin and long in an axial direction of the movable iron core is formed in the mounting surface of the valve casing at a position adjacent to the rod-insertion hole, opposite sidewalls of the mounting opening in its widthwise direction are respectively formed with engaging grooves, the slide member includes a pair of pawls which are slidably engaged with the engaging grooves and a connection plate which is engaged with the operation rod, the slide member is mounted to the mounting opening such that the slide member can move in a longitudinal direction of the mounting opening, and is resiliently pushed toward a non-operation position by a spring.

In the invention, it is preferable that the rod-insertion hole is provided at its portion of hole wall with an opening which is in communication with the operating portion mounting opening, the connection plate is engaged with the operation rod through this opening, the operation rod is provided at its outer peripheral surface with a seal member and a connection groove with which a U-shaped notch of the connection plate.

With this structure, it is possible to connect the slide member and the operation rod to each other with a simple structure, and to transmit the driving force of the slide member to the operation rod precisely. Further, the operating member is reliably returned to the non-operation position by the spring.

According to another embodiment of the invention, the operating member includes, in addition to the slide member, a second member for displacing the slide member, the second member is disposed at a position adjacent to the slide member in the operating portion mounting opening such that the second member can turn in a state in which the second member abuts against the slide member, and by this turning operation, the slide member is displaced between an operation position and the non-operation position, and is locked at the operation position and the non-operation position.

In this case, it is preferable that the slide member includes a partially circular opening, the second member is fitted into the opening, the second member is provided at its upper surface with an operating portion for turning and operating, and a cam-acting portion which abuts against an end wall of the operating portion mounting opening and turns, and by eccentric motion caused by the turning motion of the cam-acting portion, the second member moves to move the slide member to the operation position and to the non-operation position.

Further, the valve casing has a pair of sidewalls rising from the mounting surface at positions of opposite sides of the operating portion mounting opening, the second member includes a stopper which abuts against the sidewalls at a turning position where the slide member is moved to the operation position and the non-operation position.

BRIEF DESCRIPTION OF THE INVENTION

DETAILED DESCRIPTION

Figure 1:
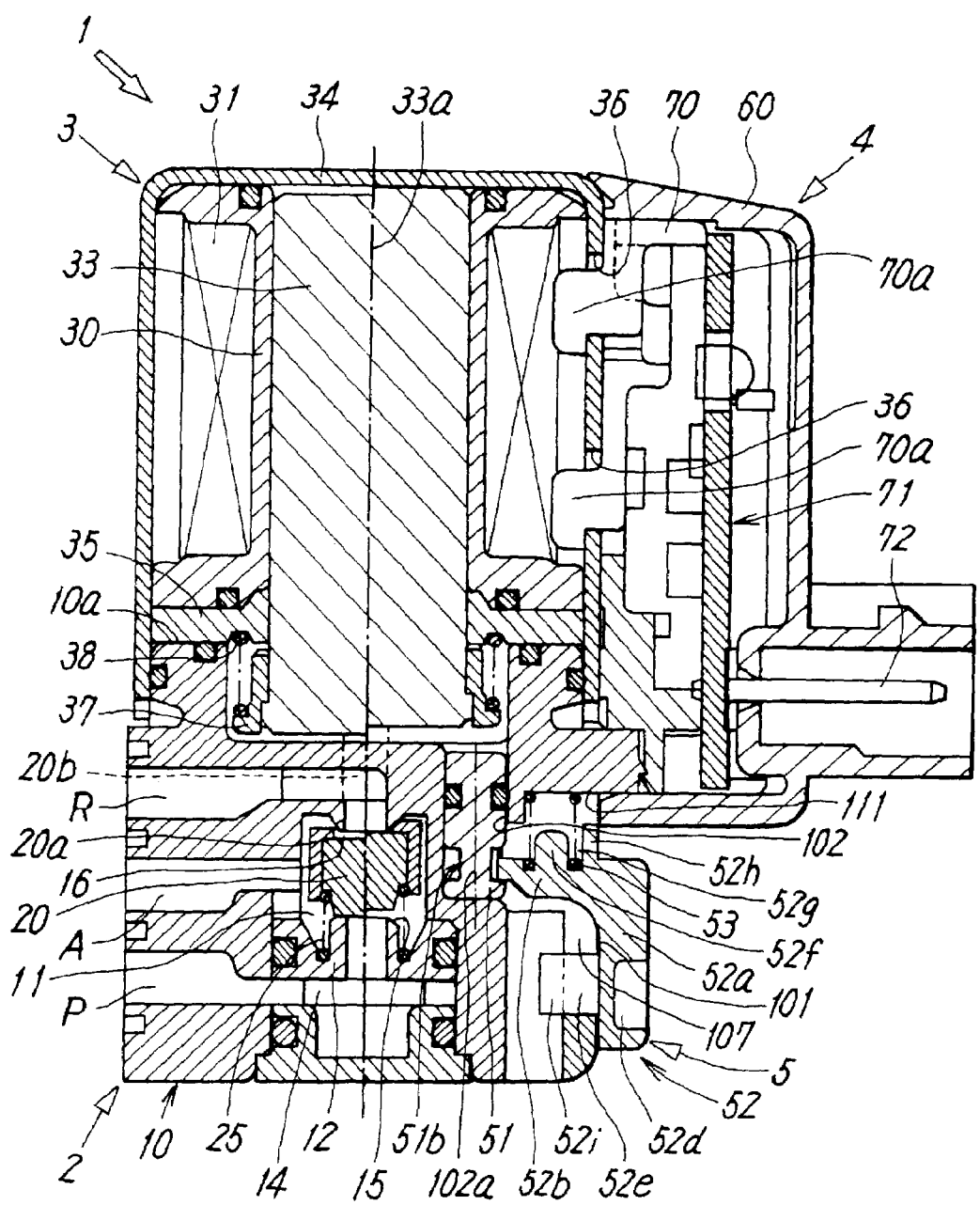
FIG. 1 is a vertical side sectional view showing one embodiment of a solenoid valve having a manually-operated device of the present invention. A left half of FIG. 1 shows a non-energized state and a right half shows an energized state of the solenoid valve.
Figure 2:
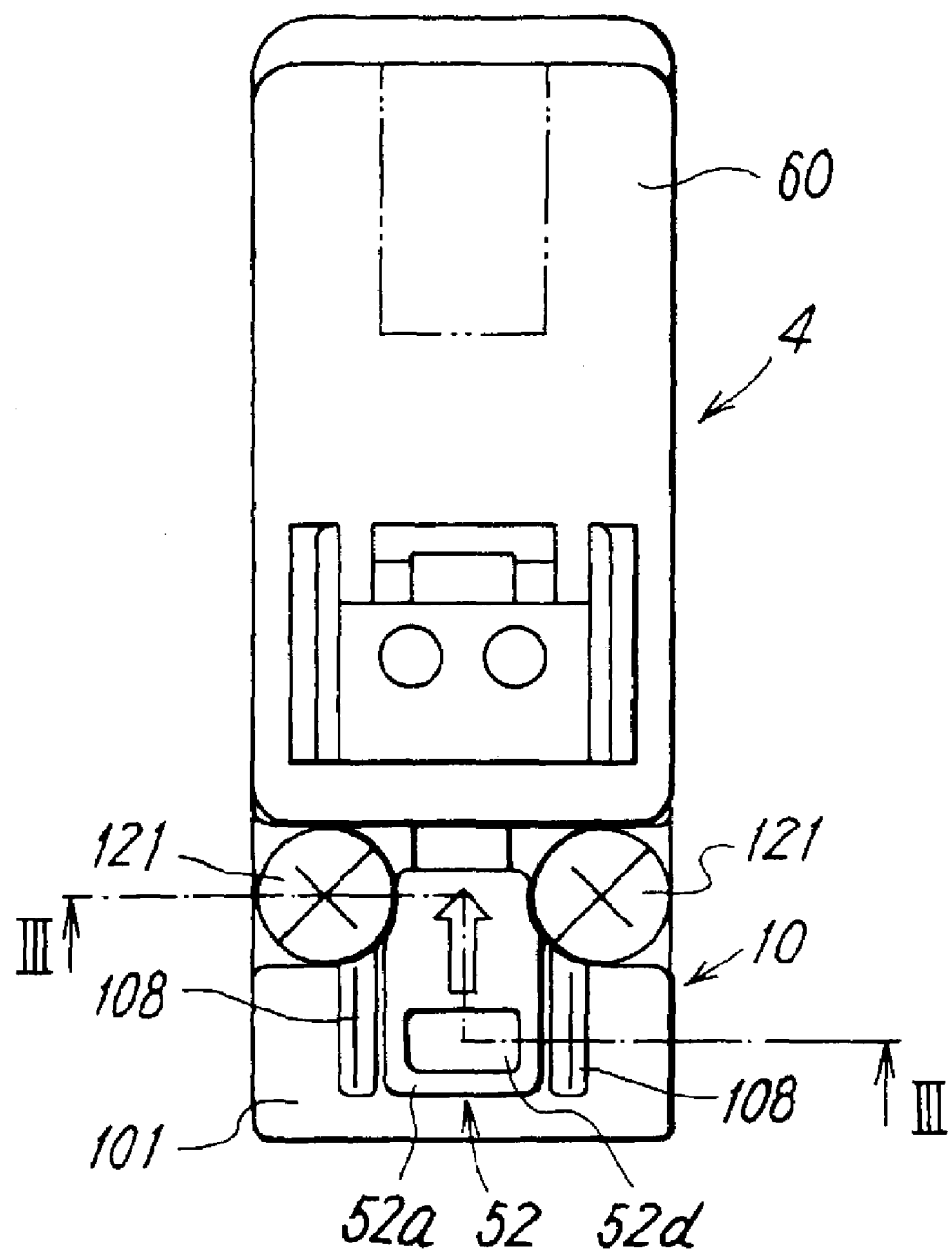
FIG. 2 is a front view of the solenoid valve.

FIGS. 1 to 4 shows a first embodiment of a solenoid valve having a manually-operated device. According to the present invention, as shown in FIG. 1, this solenoid valve 1 includes a main valve 2 having a valve member 20 which switches over flow paths by approaching and separating from valve seats 15 and 16 in a valve casing 10, and a solenoid operating portion 3 which drives the valve member 20 toward and away from the valve seats 15 and 16. A terminal casing 4 for energizing the solenoid operating portion 3 is provided from the solenoid operating portion 3 to the main valve 2 along outsides thereof.

Figure 4:
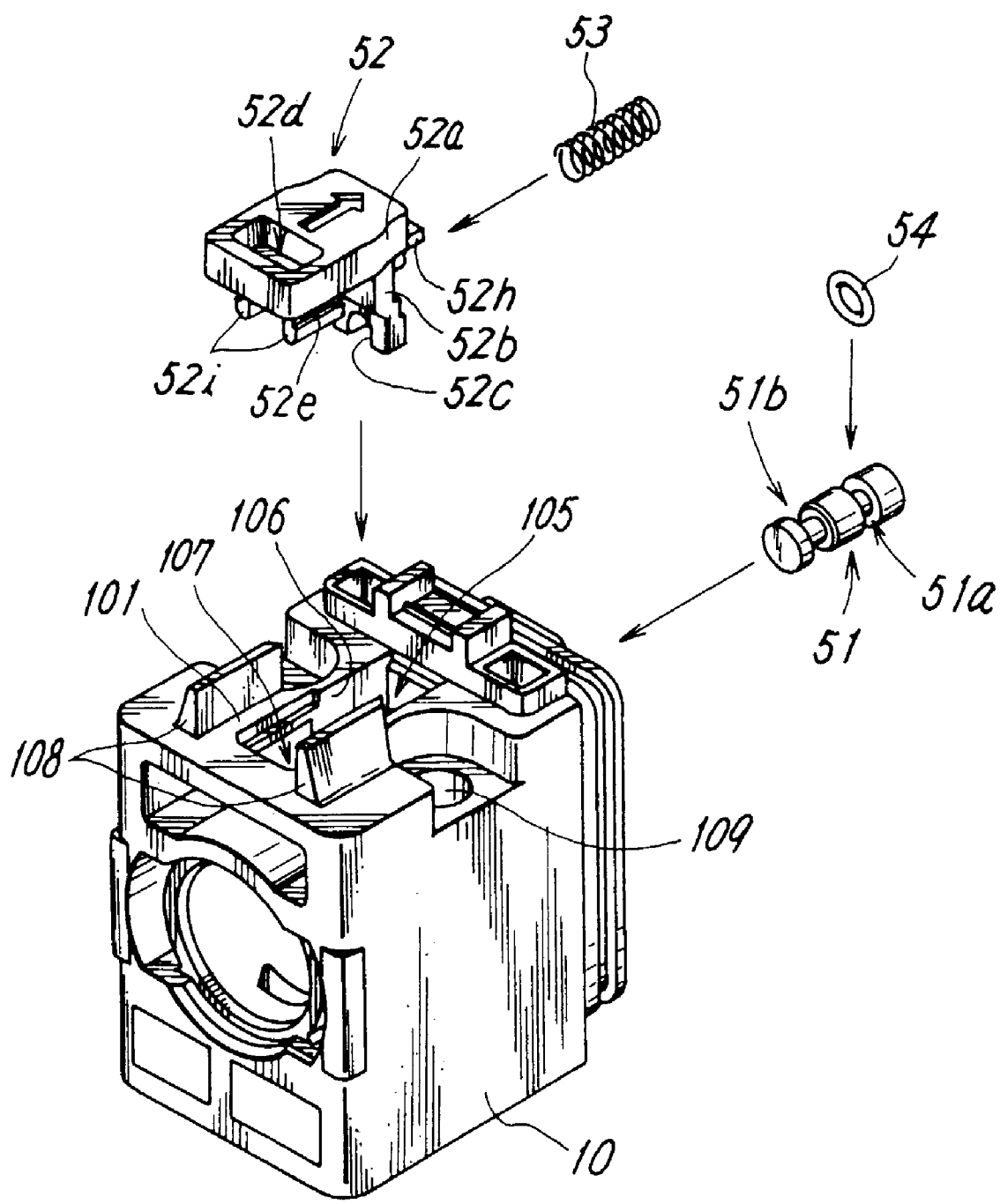
FIG. 4 is an exploded perspective view of a valve casing and the manually-operated device.

As shown in FIGS. 1 and 4, a manually-operated device 5 used for the solenoid valve 1 includes an operation rod 51 which abuts against an end surface of a movable iron core 33 of the solenoid operating portion 3 for pushing the movable iron core 33 in its axial direction, and an operating member 52 for operating the operation rod 51. The operating member 52 is movably mounted to an outer mounting surface 101 of the valve casing 10. The operation rod 51 is slidably accommodated in a rod-insertion hole 102 provided in the valve casing 10. A 102a of the rod-insertion hole 102 is in parallel to an axis 33a of the movable iron core 33 of the solenoid operating portion 3.

The valve casing 10 includes an operating portion mounting opening 105 which is formed on the mounting surface 101 for the operating member 52 and which extends in the axial direction of the movable iron core 33, and engaging grooves 107 provided in the opposite sidewalls 106 in the widthwise direction of the operating portion mounting opening 105. As shown in FIG. 1, a spring 53 which resiliently pushes the operating member 52 in the opposite direction from the movable iron core 33 is fitted in a spring guide member 52f between a spring receiving surface 111 provided on the valve casing 10 and a spring seat 52g provided on an end wall of the operating member 52.

As shown in FIGS. 1 and 4, the operating member 52 comprises a plate-like member body 52a extending in parallel to the axis of the movable iron core 33, a V-shaped notch 52c of a connection plate 52b extending at right angles from a front end of the member body 52a and having an end to which the operation rod 51 is fitted, the spring guide member 52f and the spring seat 52g provided on the connection plate 52b, a projecting plate 52h projecting at right angles from the connection plate 52b and covering the spring guide member 52f and the spring seat 52g, and an operating recess 52d formed in an upper surface of the member body 52a.

Figure 3:
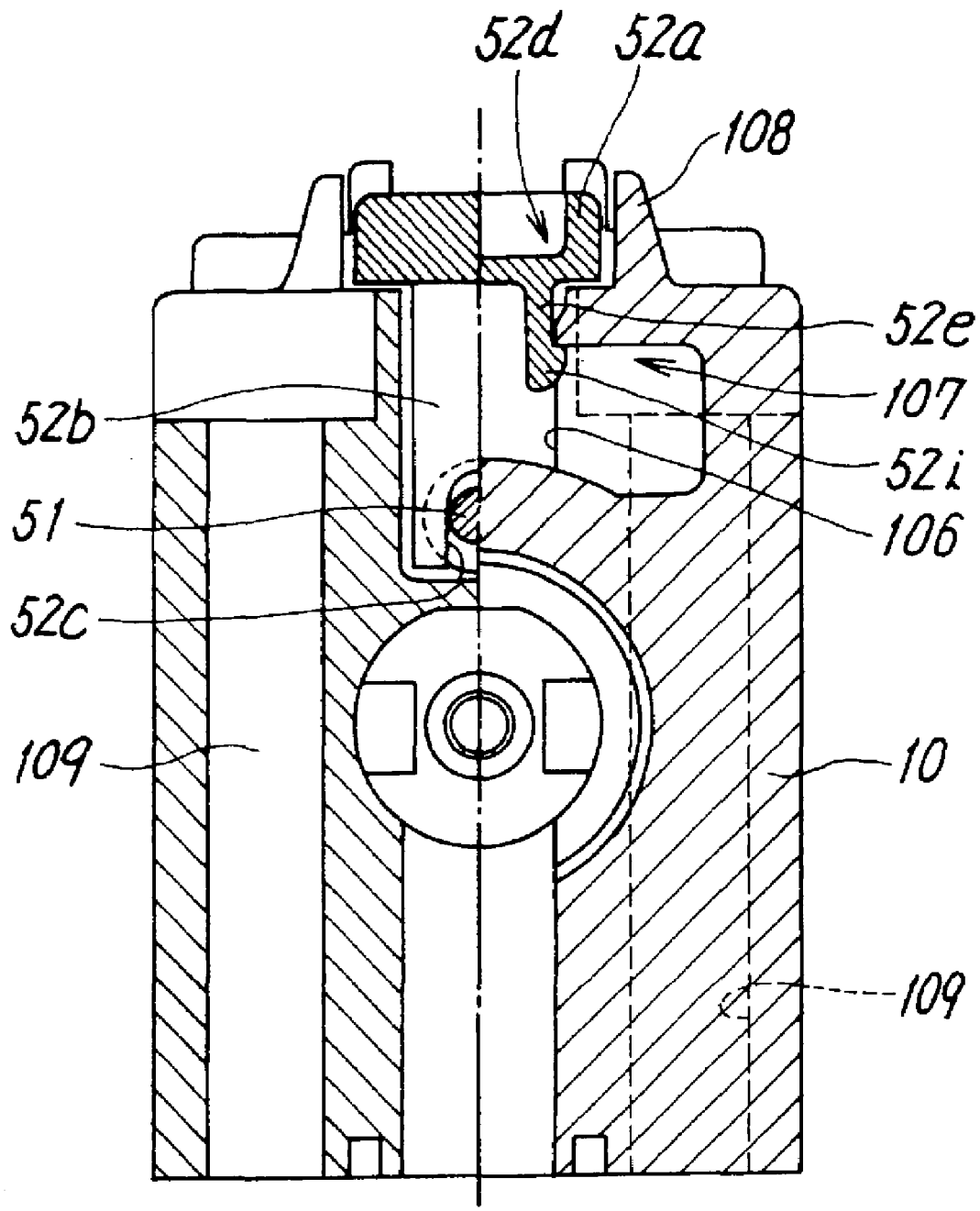
FIG. 3 is a sectional view taken along an arrow III—III in FIG. 2.

The operating member 52 can move in a direction parallel to the axis of the movable iron core 33. The operating member 52 includes a pair of pawl plates 52e extending from the opposite sidewalls of the recess 52d of the member body 52a. Pawls 52i provided on the pawl plates are slidably engaged with the engaging grooves 107. As shown in FIG. 3, the pawls 52i are engaged with the engaging grooves 107 by resilient forces of the pawl plates 52e, and portion of wall surfaces which form the engaging grooves 107 are sandwiched between the pawls 52i and a bottom surface of the member body 52a. Therefore, the operating member 52 can be assembled into the valve casing 10 only by press fitting the operating member 52 into the operating portion mounting opening 105. The operating member 52 itself functions as a slide member which directly engages the operation rod 51 to move the operation rod 51.

The operation rod 51 includes an annular seal groove 51a, an O-ring 54 mounted to an outer peripheral surface of the seal groove 51a, and a connection groove 51b with which a U-shaped notch 52c of the connection plate 52b is engaged.

The rod-insertion hole 102 is provided at a portion of its hole wall with an opening which is in communication with the operating portion mounting opening 105. The connection plate 52b is inserted into the rod-insertion hole 102 through this opening. The U-shaped notch 52c of the connection plate 52b is fitted into the connection groove 51b of the operation rod 51. With this arrangement, the operating member 52 and the operation rod 51 are connected to each other.

The valve casing 10 comprises a pair of sidewalls 108 projecting from the mounting surface 101 and extending in a longitudinal direction of the mounting opening 105 at opposite side positions of the operating portion mounting opening 105 in its widthwise direction.

As shown in FIG. 3, the valve casing 10 includes a pair of through holes 109 at positions which are symmetric with respect to a center axis of the valve casing 10. Mounting bolts 121 (see FIG. 2) for mounting the valve casing 10 to other equipment pass through the through holes 109.

As shown in FIG. 1, the main valve 2 constitutes a three port connection valve. The valve casing 10 of the main valve 2 is provided therein with a valve chamber 11 with which an input port P, an output port A and an exhaust port R are in communication.

A valve seat body 12 having a supply valve seat 15 is accommodated in the valve chamber 11. The supply valve seat 15 is in communication with the input port P through a flow path 14. An exhaust valve seat 16 which is in communication with the exhaust port R is provided at a position opposed to the supply valve seat 15 in the valve chamber 11. A poppet valve member 20 is accommodated between the supply valve seat 15 and the exhaust valve seat 16. The poppet valve member 20 selectively opens and closes the supply valve seat 15 and the exhaust valve seat 16.

The poppet valve member 20 energizes and de-energizes the solenoid operating portion 3, thereby opening and closing the valve seats 15 and 16. Since the solenoid operating portion 3 allows the poppet valve member 20 to open and close the valve seats in this manner, the poppet valve member 20 is provided with a pair of push rods 20b integrally formed with a cover 20a which covers an outer periphery of the poppet valve member 20, the push rods 20b is brought toward the solenoid operating portion 3 from a hole formed in the valve casing 10 at position astride the exhaust valve seat 16, and a tip end of the push rods 20b is allowed to abut against the movable iron core 33 of the solenoid operating portion 3.

A poppet spring 25 for pushing the poppet valve member 20 toward the exhaust valve seat 16 is provided between the poppet valve member 20 and the supply valve seat 15 in the valve seat body 12.

As shown in FIG. 1, the solenoid operating portion 3 includes a bobbin 30 formed by winding a coil 31, the movable iron core 33 slidably fitted into a center hole of the bobbin 30, a magnetic cover 34 for surrounding the coil 31, and a magnetic plate 35 located between the magnetic cover 34 and the movable iron core 33. A magnetic path is formed around the coil 31 by the magnetic cover 34 and the magnetic plate 35.

The magnetic cover 34 is formed by deep-drawing a magnetic material (iron plate). The magnetic cover 34 covers the entire solenoid operating portion 3 to form a profile of the solenoid operating portion 3. Here, the magnetic cover is provided at its side surface with a mounting hole 36 for the terminal casing 4, but if the terminal casing 4 is fixed by adhesion or other means which does not inhibits liquid-tightness of the magnetic cover 34, it is possible to secure the resistance to water and drip of the solenoid operating portion 3.

A ring 37 made of synthetic resin is fitted over an outer end of the movable iron core 33. A returning spring 38 for returning the moving core is provided between the ring 37 and the magnetic plate 35.

In the terminal casing 4, legs 70a of a terminal block 70 made of synthetic resin and located at a base portion of the terminal casing 4 is engaged with the mounting hole 36, thereby fixing the legs to the magnetic cover, a substrate assembly 71 is placed on the terminal block 70, and a connector cover 60 is put thereon. An electrical connection connector 72, a display lamp and other electronic component are mounted to the substrate assembly 71.

It is not always necessary to mount the terminal casing 4 to the solenoid operating portion 3 only, and the terminal casing 4 can be mounted to both the solenoid operating portion 3 and the valve casing 10.

In the solenoid valve having the manually-operated device, when the valve member 20 closes the valve seat due to an accident such as a power failure, the operation rod 51 connected to the operating member 52 is moved by moving the operating member 52 which has been retreated to the non-operation position to the operation position, the end surface of the movable iron core 33 is pressed by the operation rod 51 to move the movable iron core 33, thereby separating the valve member 20 from the valve seat 15.

In this case, the operation rod 51 which abuts against the end surface of the movable iron core 33 to press the movable iron core 33 in its axial direction is air-tightly and slidably accommodated in the rod-insertion hole 102 which is in parallel to the axis of the movable iron core 33, and the operating member 52 which drives the operation rod 51 is movably mounted the mounting surface 101 of the valve casing 10. Therefore, it is unnecessary to dispose the manually-operated device 5 near the end of the movable iron core 33, and a deviated load is not applied to the operation rod 51.

Therefore, the manually-operated device 5 can be disposed in the solenoid valve 1 while avoiding a portion constituted by a substrate or the like on which an electronic component such as a connector for electrical connection and a lamp is mounted, and it is possible to prevent a seal failure due to the deviated load from being generated.

According to the solenoid valve having the manually-operated device, only by moving the operating member 52 in the axial direction of the movable iron core 33, the operation rod 51 connected to the operating member 52 can be moved in the same direction. The rod-insertion hole 102 is provided at its portion of hole wall with the opening which is in communication with the operating portion mounting opening 105, and the U-shaped notch 52c of the connection plate 52b is engaged with the connection groove 51c of the outer peripheral surface of the operation rod 51. Therefore, it is possible to connect the operating member 52 and the operation rod 51 to each other with a simple structure, and to precisely transmit the driving force of the operating member 52 to the operation rod 51.

According to the solenoid valve having the manually-operated device, the operating member 52 is provided at the end wall with the spring seat 52g having the spring guide member 52f, and the operating member 52 is pushed in the opposite direction from the movable iron core 33 by the spring 53 provided between the spring seat 52g and the spring receiving surface 111 of the valve casing. Therefore, the operating member 52 and the operation rod 51 connected thereto are reliably returned toward the OFF position.

FIGS. 5 to 10 shows a second embodiment in which the manually-operated device is of locking type. The manually-operated device in the second embodiment has basically the same structure as that of the first embodiment shown in FIGS. 1 to 4, and a structure of the operating member of the second embodiment is different in the following points.

Therefore, in the second embodiment, the same portions as those in the first embodiment are designated with the same symbols, and explanation thereof is omitted.

Figure 5:
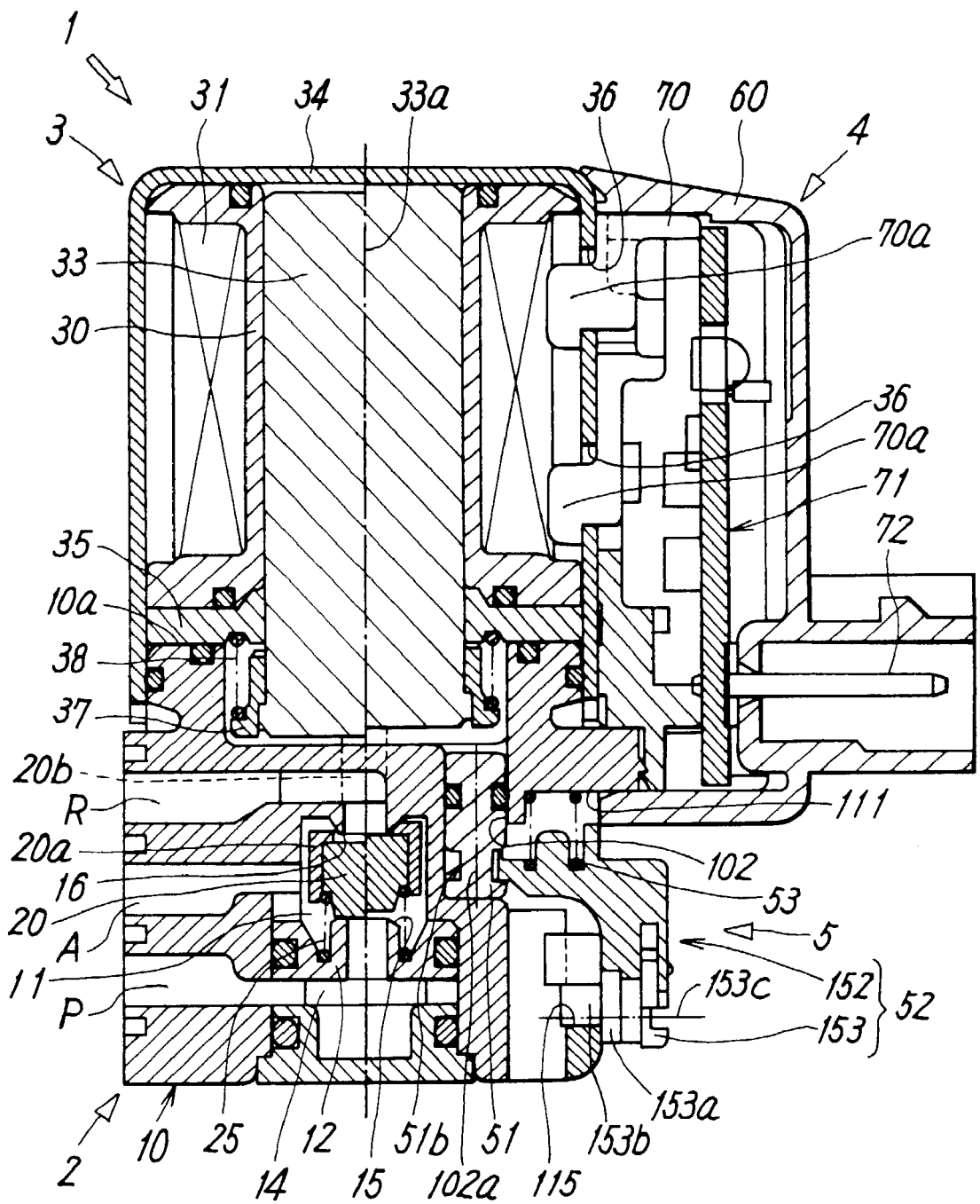
FIG. 5 is a vertical side sectional view showing another embodiment of the manually-operated device of the present invention. A left half of FIG. 5 shows a non-energized state and a right half shows an energized state of the solenoid valve.
Figure 6:
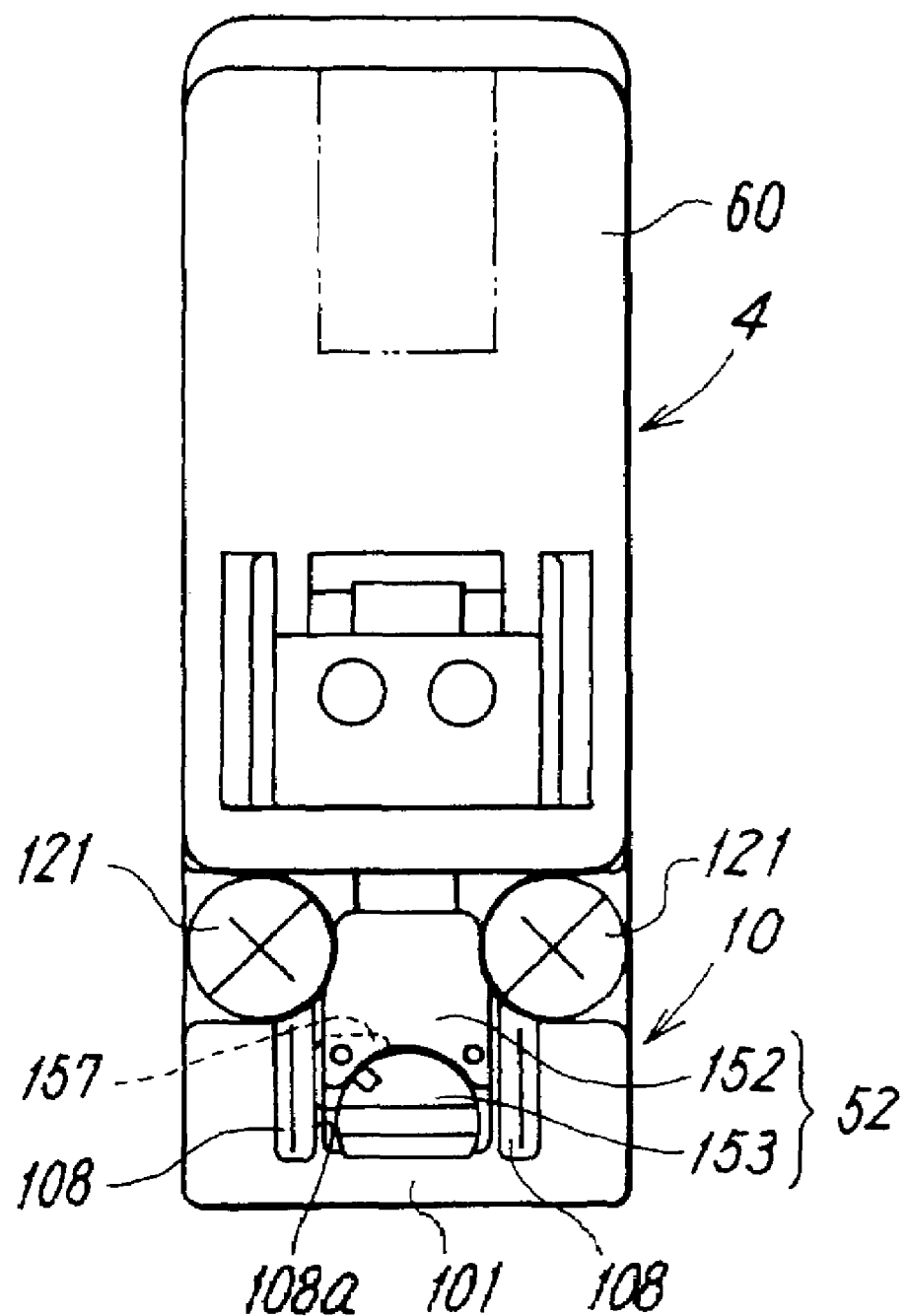
FIG. 6 is a front view of the solenoid valve.
Figure 7:
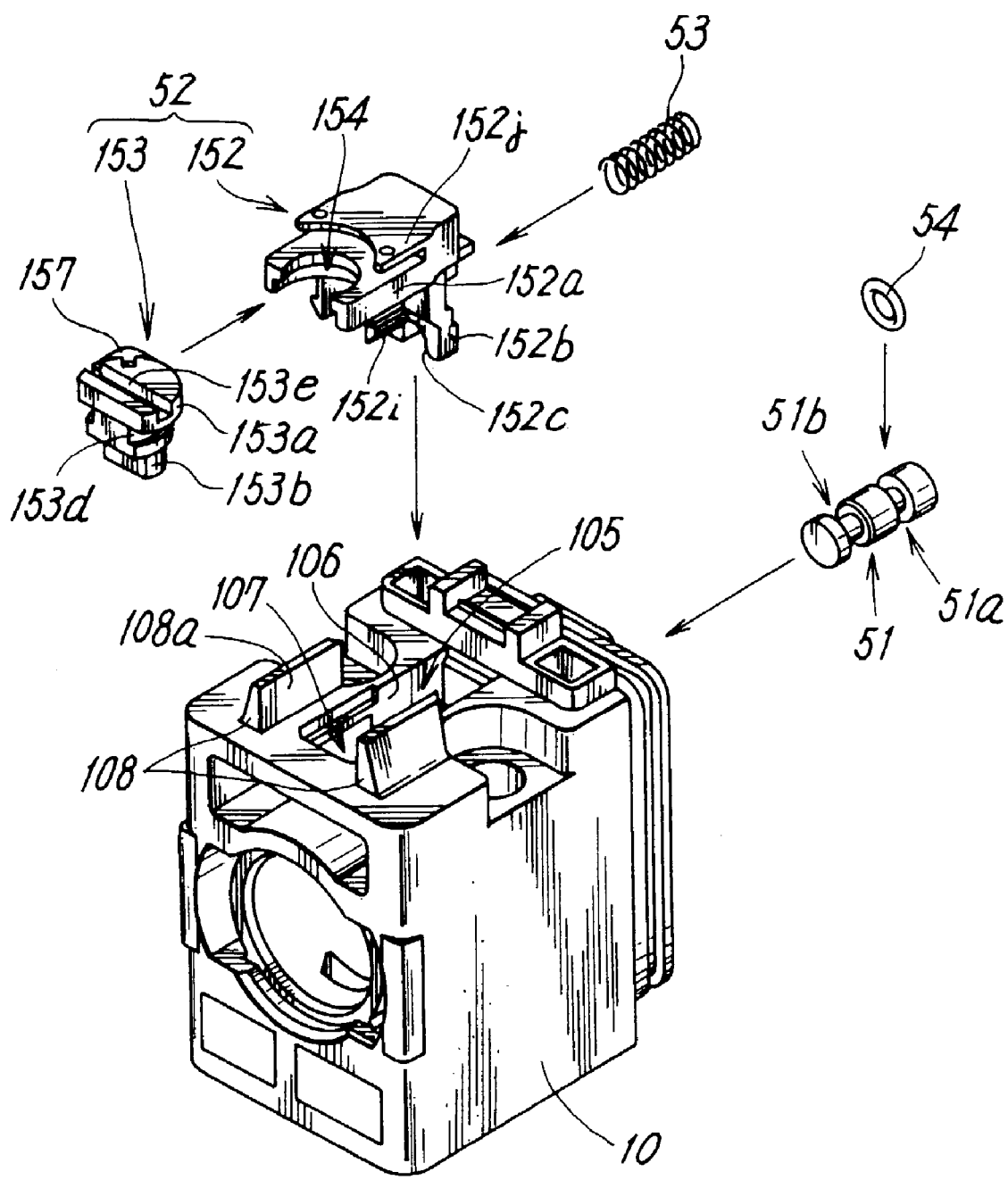
FIG. 7 is an exploded perspective view of a valve casing and the manually-operated device.
Figure 8A:
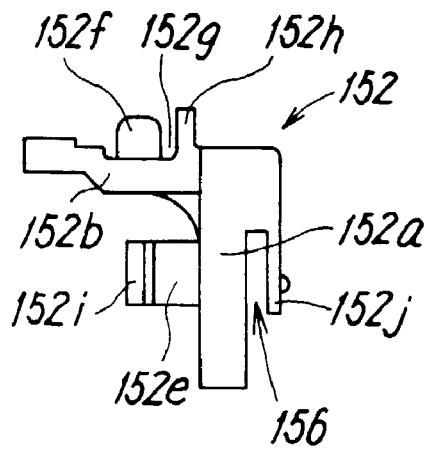
FIG. 8A is a side view of a first member.
Figure 8B:
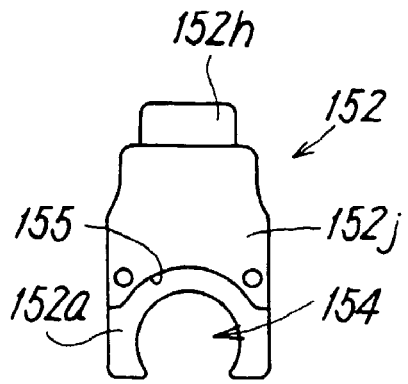
FIG. 8B is a front view of the first member.
Figure 8C:
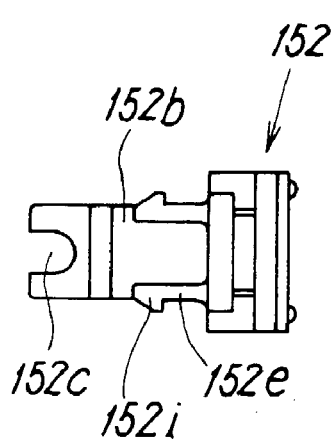
FIG. 8C is a bottom view of the first member.
Figure 8D:
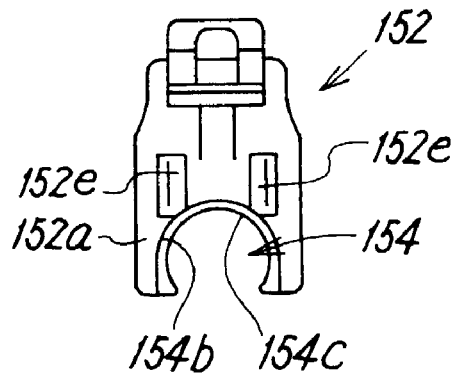
FIG. 8D is a back view of the first member and FIG. 8E is a vertical side sectional view of the first member.
Figure 8E:
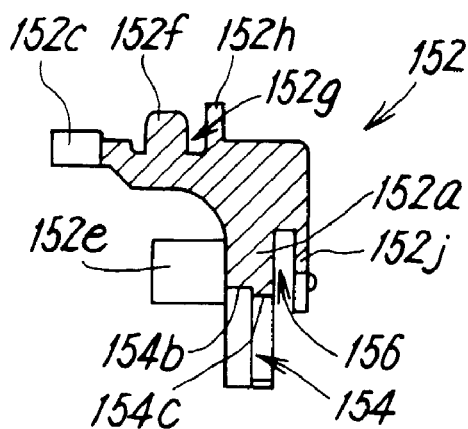
Figure 9A:
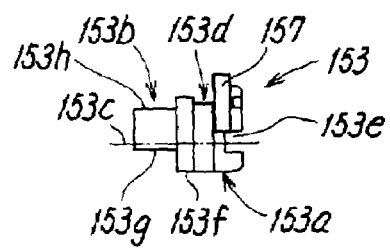
FIG. 9A is a side view of a second member.
Figure 9B:
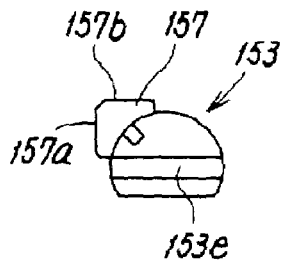
FIG. 9B is a front view of the second member.
Figure 9C:
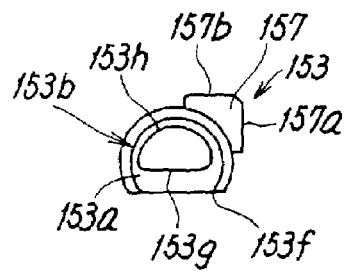
FIG. 9C is a back view of the second member and FIG. 9D is a bottom view of the second member.
Figure 9D:
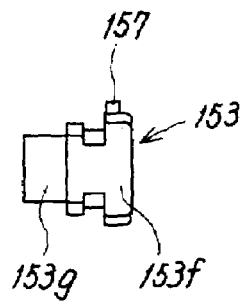

As shown in FIGS. 5 to 7, in the manually-operated device 5, the operating member 52 comprises a first member 152 and a second member 153 which applies an operation force to the first member 152 by turning motion.

As shown in FIGS. 7 and 8, the first member 152 comprises a plate-like member body 152a extending in parallel to the axis of the movable iron core 33, a connection plate 152b extending at right angles from a front end of the member body 152a and provided at its tip end with a U-shaped notch 152c into which the operation rod 51 is fitted, a spring guide member 152f and a spring seat 152g provided on the connection plate 152b, and a projecting plate 152h projecting at right angles from the connection plate 152b for covering upper portions of the spring guide member 152f and the spring seat 152g. The first member 152 directly engages with the operation rod 51 to constitute a slide member which moves the operation rod 51.

The first member 152 includes a pawl plate 152e having a pair of pawls 152i. These pawls are slidably engaged with engaging grooves 107 provided in opposite sidewalls 106 of the operating portion mounting opening 105 of the valve casing 10 in the widthwise direction. The above-described structure of the first member 152 is the same as that of the operating member 52 in the first embodiment.

However, the first member 152 is different from the operating member 52 of the first embodiment in that the member body 152a is provided at its rear end with an opening 154 having an arc larger than a semi-circle, and the second member 153 is fitted into the opening 154.

As shown in FIGS. 7 and 8, the opening 154 has a partial circular shape whose circumference is longer than the semi-circle. As shown in FIG. 8E, the opening 154 comprises a first recessed wall portion 154b and a second recessed wall portion 154c having slightly smaller diameter that that of the first recessed wall portion 154b. The first member 152 is integrally provided with the plate-like member body 152a and a guide plate 152j located above the member body 152a at a vertical distance therebetween. The guide plate 152j is provided at its tip end with an arc recessed wall portion 155.

A space between the member body 152a and the guide plate 152j becomes a passage 156 through which a later-described stopper 157 passes when the second member 153 is turned.

As shown in FIGS. 7 and 9, the second member 153 comprises a rotation support portion 153a having a shape formed by superposing, on one another, a plurality of partially cylindrical columns whose cylindrical column surfaces are larger than a semi-cylindrical column, and a cam-acting portion 153b integrally formed on the rotation support portion 153a. This cam-acting portion has a shape of a partially cylindrical column having a cylindrical column surface larger than the semi-cylindrical column, an axis 153c of the cam-acting portion is located at the same position as an axis of the rotation support portion 153a, and a radius of the cylindrical column surface is smaller than that of the rotation support portion.

An arc engaging groove 153d is provided in a wall portion on the side of the cylindrical column surface of the rotation support portion 153a. A recessed wall portion 154c of the opening 154 of the first member 152 is rotatably fitted into the engaging groove 153d. A flat surface wall portion 153f is provided on the opposite side of the rotation support portion 153a from the cylindrical column surface. A groove 153e crossing the axis 153c is provided in an upper surface of the rotation support portion 153a. This groove functions as an operating portion for turning and operating the second member 153.

The cam-acting portion 153b includes a wall portion 153h having a shape of cylindrical column surface, and a flat wall portion 153g which is in parallel to a flat wall portion 153f of the rotation support portion. At the time of non-operation, the flat wall portion 153g is pushed against an end wall 115 of the operating portion mounting opening 105 by a force of the spring 53. The end wall 115 is a wall surface with which the wall portion 153h having the shape of the cylindrical column surface of the cam-acting portion 153b is contacted under pressure as the second member 153 is turned, and the end wall 115 becomes a reaction force end surface which supplies a reaction force as reaction to the cam-acting portion 153b.

A substantially triangular stopper 157 is fixed to a wall portion having a cylindrical column surface above the engaging groove 153d on the rotation support portion 153a. The stopper 157 includes flat two side surfaces 157a and 157b intersecting with each other at right angles. When the second member 153 is turned, one of the flat side surfaces 157a and 157b abuts against a stopper surface 108a of the sidewall 108 provided on the valve casing 10, thereby limiting the turning motion of the second member 153 and maintaining the turning-limited position.

Figure 10A:
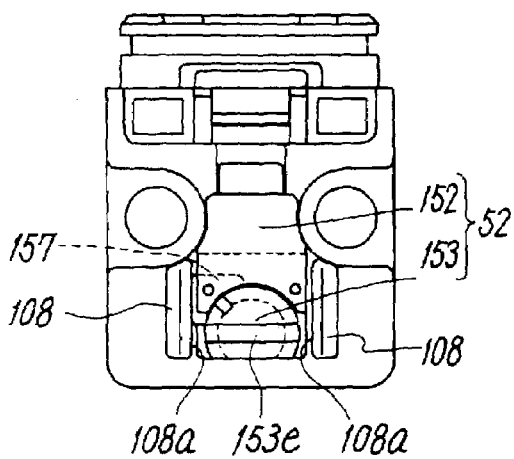
FIG. 10A is a front view showing a state in which the second member in one of turning-limited positions (operation rod is in OFF position) and FIG. 10B is a front view showing a state in which the second member in the other turning-limited position (operation rod is in ON position).
Figure 10B:
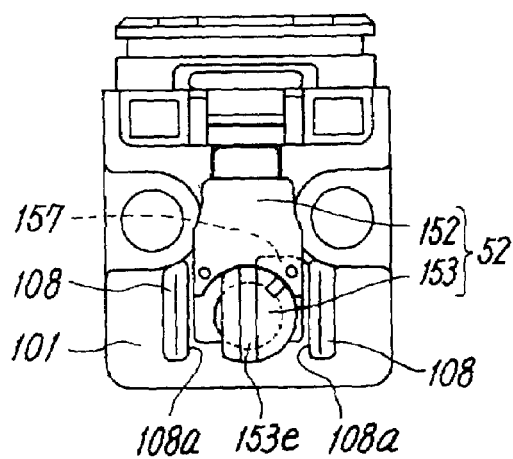
Figure 11:
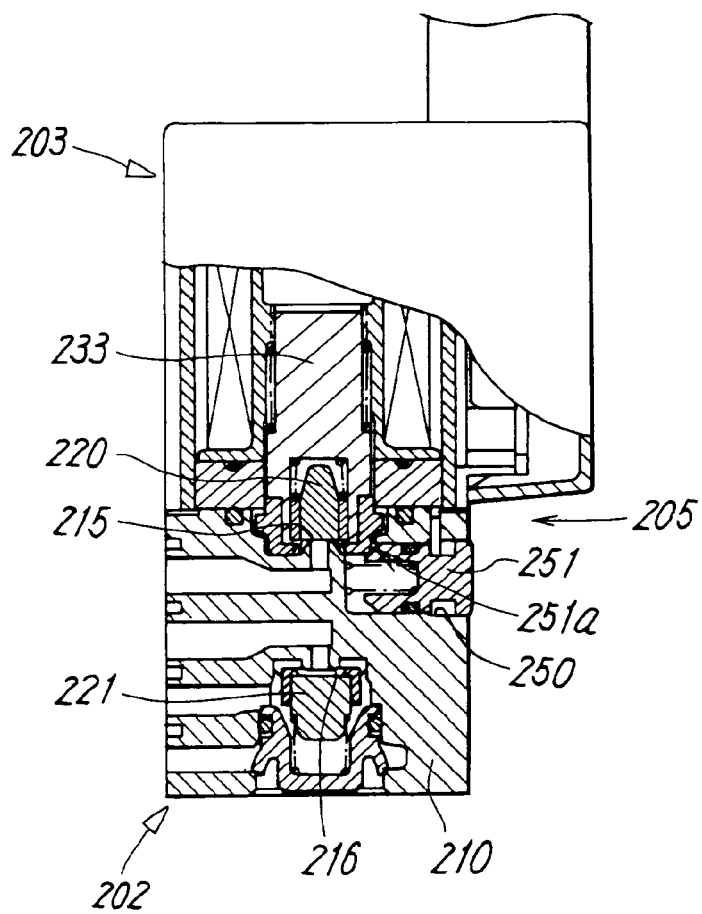
FIG. 11 is a vertical side sectional view showing a conventional solenoid valve having a manually-operated device.
Figure 12:
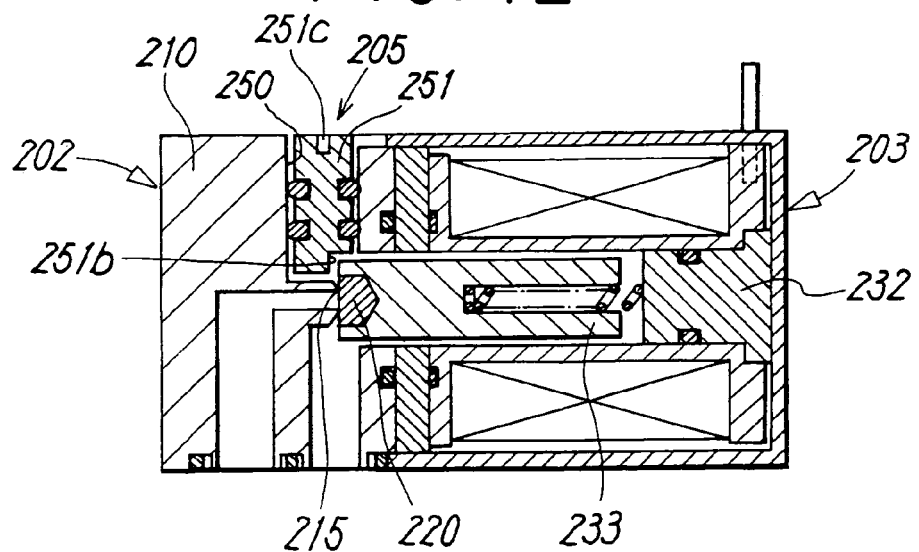
FIG. 12 is a sectional view showing another conventional solenoid valve having a manually-operated device.

In the second embodiment, as shown in FIGS. 10A and 10B, turning-limited positions in a left direction and a right direction of the second member 153 are an OFF position and an ON position of the operation rod, respectively.

As shown in FIG. 7, the first member 152 and the second member 153 constituting the operating member 52 of the second embodiment is mounted to the operating portion mounting opening 105 of the valve casing 10. At that time, the spring 53 pushes the second member 153 through the first member 152 in a direction opposite from the movable iron core 33. Therefore, in the OFF position of the operation rod 51 shown in FIG. 10A, the flat wall portion 153g of the cam-acting portion 153b is pushed against the end wall 115 of the operating portion mounting opening 105 as shown in FIG. 5.

In this state, if the second member 153 is turned rightward (clockwise direction) utilizing the turning groove 153e, the cam-acting portion 153b which is coaxial with the rotation support portion 153a is also turned around its axis 153c, a right end portion of the flat wall portion 153g of the cam-acting portion 153b supplies a force caused by turning motion to the end wall 115 of the valve casing 10. Therefore, the cam-acting portion 153b receives a reaction force caused by the reaction from the end wall 115.

Therefore, as the second member 153 turns, the cam-acting portion 153b moves in a direction in which its axis 153c is separated from the end wall 115 by the reaction. That is, the first member 152 moves toward the movable iron core 33 against a biasing force of the spring 53, thereby moving the operation rod 51 connected to the first member 152 toward the ON position.

If the second member 153 turns from the OFF position shown in FIG. 10A rightward through 90°, as shown in FIG. 10B, the flat 157b of the stopper 157 abuts against the stopper surface 108a of one of the sidewalls 108, and the turning-limited position becomes the ON position of the operation rod 51.

If the second member 153 is turned leftward (counter-clockwise direction) from the ON position, since the axis 153c of the cam-acting portion 153b approaches the end wall 115 of the valve casing 10, the first member 152 moves away from the movable iron core 33.

In this manner, if the second member 153 is turned leftward from the ON position shown in FIG. 10B through 90°, as shown in FIG. 10A, the flat side surface 157a of the stopper 157 abuts against the stopper surface 108a of the other side wall 108, and the operation rod 51 connected to the first member 152 is returned to the OFF position.

In the manually-operated device, the second member 153 includes the stopper 157 which abuts against the sidewall 108 which becomes a stopper at one and the other turning positions to limit the turning motion, the turning-limited positions are aligned to the ON position and the OFF position of the operation rod 51. Therefore, it is possible to precisely position the ON position and the OFF position of the operation rod 51 only by turning the second member 153, the flat side surfaces 157a and 157b of the stopper 157 of the second member 153 abut against the stopper surfaces 108a of the sidewalls 108 to limit the turning motion. Therefore, the turning position of the second member is stabilized, and the ON position and the OFF position of the operation rod 51 are also stabilized.

The lock-type manually-operated device of the present invention is not always limited to the above embodiments, and it is possible to employ a structure in which the first member 152 can be pushed by turning the second member 153 without moving the second member 153, i.e., a structure in which the second member 153 has a cam-acting portion which moving the first member into a pushing direction of the operation rod by turning motion of the second member 153, thereby locking the operation rod.

The groove 153e for the driver on the operating member 153 which constitutes the turning operation portion of the second member 153 is not limited to the groove 153e, and when it is difficult to operate the solenoid valve by reducing the same in size, the second member 153 may be formed into a shape so that the operation becomes easy.

As described above, according to the present invention, it is possible to provide a solenoid valve having a manually-operated device capable of disposing the manually-operated device in the solenoid valve while avoiding a portion thereof constituted by a substrate or the like on which an electronic component such as a connector for electrical connection and a lamp is mounted, and capable of preventing a deviated load from being applied to the operating rod of the manually-operated device, and capable of preventing a seal failure from being generated.

What is claimed is:

1. A solenoid valve comprising:
   a main valve including a valve member configured to open and close a valve seat in a valve casing;
   a solenoid operating portion including a movable iron core configured to drive said valve member; and
   a manually-operated device including an operation rod configured to be accommodated in a rod-insertion hole provided in the valve casing, and an operating member configured to operate said operation rod, said operating member including a slide member configured to be movably mounted to a mounting surface provided in a side surface of said valve casing at a position adjacent to the rod-insertion hole, said slide member including a body, and a connection plate extending substantially perpendicularly from the body, said connection plate configured to interlock with the operation rod,
   wherein when said operating member is manually-operated, said slide member and said operation rod move in a direction substantially parallel to an axis of the movable iron core such that said operation rod abuts against said movable iron core to displace the movable iron core to actuate said valve member.

2. A solenoid valve according to claim 1, wherein said rod-insertion hole is provided at a position opposed to a tip end surface of said movable iron core such that an axis of said rod-insertion hole is directed in the direction substantially parallel to the axis of said movable iron core.

3. A solenoid valve according to claim 2, wherein an operating portion mounting opening which is thin and long in an axial direction of said movable iron core is formed in said mounting surface of said valve casing at the position adjacent to said rod-insertion hole, opposite sidewalls of said mounting opening in its widthwise direction are respectively formed with engaging grooves,
   said slide member includes a pair of pawls which are slidably engaged with said engaging grooves, said slide member is mounted to said mounting opening such that the slide member can move in a longitudinal direction of said mounting opening, and is resiliently pushed toward a non-operation position by a spring.

4. A solenoid valve according to claim 3, wherein said rod-insertion hole is provided at its portion of hole wall with an opening which is in communication with said operating portion mounting opening, said connection plate is engaged with said operation rod through this opening,
   said operation rod is provided at its outer peripheral surface with a seal member and a connection groove with which a U-shaped notch of said connection plate.

5. A solenoid valve according to claim 3, wherein said operating member includes, in addition to said slide member, a second member for displacing said slide member, said second member is disposed at a position adjacent to said slide member in said operating portion mounting opening such that said second member can turn in a state in which said second member abuts against said slide member, and by this turning operation, said slide member is displaced between an operation position and said non-operation position, and is locked at the operation position and the non-operation position.

6. A solenoid valve according to claim 5, wherein said slide member includes a partially circular opening, said second member is fitted into said opening, said second member is provided at its upper surface with an operating portion for turning and operating, and a cam-acting portion which abuts against an end wall of said operating portion mounting opening and turns, and by eccentric motion caused by the turning motion of said cam-acting portion, said second member moves to move said slide member to the operation position and to the non-operation position.

7. A solenoid valve according to claim 5, wherein said valve casing has a pair of sidewalls rising from said mounting surface at positions of opposite sides of said operating portion mounting opening, in said mounting surface said second member includes a stopper which abuts against said sidewalls at a turning position where said slide member is moved to said operation position and said non-operation position.

8. A solenoid valve according to claim 6, wherein said valve casing has a pair of sidewalls rising from said mounting surface at positions of opposite sides of said operating portion mounting opening, in said mounting surface said second member includes a stopper which abuts against said sidewalls at a turning position where said slide member is moved to said operation position and said non-operation position.

* * * * *